(12) United States Patent
Monnerie et al.

(10) Patent No.: US 12,065,767 B2
(45) Date of Patent: Aug. 20, 2024

(54) INDUSTRIAL WOVEN FABRIC

(71) Applicant: ASTENJOHNSON PGMBH, Eupen (BE)

(72) Inventors: Jean-Louis Monnerie, Saint-Junien (FR); Dieter Kuckart, Eupen (BE)

(73) Assignee: ASTENJOHNSON PGMBH, Eupen (BE)

( * ) Notice: Subject to any disclaimer, the term of this patent is extended or adjusted under 35 U.S.C. 154(b) by 181 days.

(21) Appl. No.: 17/402,517

(22) Filed: Aug. 14, 2021

(65) Prior Publication Data

US 2022/0042215 A1 Feb. 10, 2022

Related U.S. Application Data

(63) Continuation-in-part of application No. 16/112,120, filed on Aug. 24, 2018, now abandoned, which is a
(Continued)

(30) Foreign Application Priority Data

Apr. 27, 2016 (DE) .......................... 102016107811.5

(51) Int. Cl.
*D03D 1/00* (2006.01)
*B65G 15/30* (2006.01)
(Continued)

(52) U.S. Cl.
CPC ........... *D03D 1/0094* (2013.01); *B65G 15/30* (2013.01); *D03D 15/292* (2021.01); *D04H 3/16* (2013.01); *D10B 2505/00* (2013.01)

(58) Field of Classification Search
None
See application file for complete search history.

(56) References Cited

U.S. PATENT DOCUMENTS

RE21,700 E * 1/1941 Whittier ................ D21F 1/0036
139/411
5,117,865 A * 6/1992 Lee ........................ D21F 7/083
162/903
(Continued)

FOREIGN PATENT DOCUMENTS

| CN | 106192123 | * 12/2016 |
| GB | 1096204 | * 12/1967 |
| WO | WO2015015895 | * 2/2015 |

OTHER PUBLICATIONS

Machine translation of WO2015015895 (Year: 2015).*
Machine translation of CN106192123 (Year: 2016).*

*Primary Examiner* — Shawn Mckinnon
(74) *Attorney, Agent, or Firm* — Von Rohrscheidt Patents

(57) ABSTRACT

A method for producing a non-woven material, the method comprising: using a spun non-woven or melt spun method; using an arrangement including a conveyor belt; and forming a web of the non-woven material on a surface of the conveyor belt while being moved, wherein the conveyor belt includes a product side that is in contact with the non-woven material, and a machine side that is in contact with conveying devices of the arrangement to produce the non-woven material, wherein the conveyor belt includes longitudinal threads that extend in a running direction of the web of the non-woven material and transversal threads perpendicular to the longitudinal threads, wherein at least a portion of the longitudinal threads of a surface that is oriented towards the product side of the conveyor belt is made from a polymeric material which includes at least a portion of a thermoplastic elastomeric material.

17 Claims, 2 Drawing Sheets

Related U.S. Application Data continuation of application No. PCT/EP2017/058947, filed on Apr. 13, 2017.

(51) Int. Cl.
    *D03D 15/292*     (2021.01)
    *D04H 3/16*     (2006.01)

(56) References Cited

U.S. PATENT DOCUMENTS

| | | | | |
|---|---|---|---|---|
| 6,065,505 A | * | 5/2000 | Fickers | D21F 1/0054 428/222 |
| 6,241,081 B1 | * | 6/2001 | Holden | D21F 1/0054 198/844.2 |
| 6,790,796 B2 | * | 9/2004 | Smith | D03D 15/37 442/187 |
| 2004/0261883 A1 | * | 12/2004 | Harrison | D03D 11/00 139/383 A |
| 2015/0322603 A1 | * | 11/2015 | Brown | D01D 4/025 264/114 |

* cited by examiner

INDUSTRIAL WOVEN FABRIC

RELATED APPLICATIONS

This application is a continuation in part of U.S. patent application Ser. No. 16/112,120 filed on Aug. 24, 2018 which is a continuation of International application PCT/EP2017/058947 filed on Apr. 13, 2017, which claims priority from German Patent Application DE 10 2016 107 811.5 filed on Apr. 27, 2016, all of which are incorporated in their entirety by this reference.

FIELD OF THE INVENTION

The invention relates to an industrial woven fabric, in particular a conveyor belt, for transporting a web of a nonwoven fabric, in particular during its production or handling in a piece of production equipment including a product side that is in contact with the nonwoven fabric and a machine side that is in contact with a transport arrangement of a piece of equipment to produce the nonwoven fabric, wherein the woven fabric includes longitudinal threads that extend in a running direction of the web of the nonwoven fabric and transversal threads that are arranged perpendicular to the running direction and which are woven together.

Typically the warp threads of the fabric are formed by its longitudinal threads and the weft threads are formed by its transversal threads which however is not mandatory. Alternatively it is also possible that the fabric is woven in an endless manner, and the warp threads form the transversal threads and the weft threads form the longitudinal threads of the fabric. Typically the longitudinal threads of the finished fabric are also designated as MD-threads (machine direction threads) and the transversal threads are designated as CMD-threads (cross machine direction threads).

BACKGROUND OF THE INVENTION

Nonwovens or non-woven fabrics (or French non tissé) are typically made directly from fibers without using the steps of weaving or knitting that are used for classic textile contextures to produce and process the threads. A non-woven material according to the invention is a contexture made from fibers with limited length, endless fibers (filaments) or cut yarns of any type and any origin which are joined in any way to form a non-woven material (a fiber layer, a gauze) and connected with each other in any manner. A production of so-called spun bound non-woven materials or so-called melt blown non-woven materials is well known. When producing the non-woven materials the extruded and stretched fibers are placed on a transport belt to form a flat web, namely the subsequent non-woven material, wherein the fibers are in a hot and sticky condition at this point in time so that they adhere to each other and form a coherent non-woven material web. Alternatively, also the method of so-called air laying is known wherein the non-woven material web is solidified after laying the fibers, thus using a mechanical needling step or water jet impinging.

The conveyor belts used for the production of the non-woven material are quite important for the quality of the non-woven material and reliability of production. Typically the conveyor belts are made from fabrics made from synthetic material monofilaments wherein metal fabrics can also be used alternatively when temperature conditions during non-woven production do not permit using synthetic material based conveyor belts. Typically the synthetic material monofilaments or metal threads that are being used have a smooth surface and therefore surface portions of the woven transport belt that are formed therefrom are also smooth accordingly. A smooth surface can lead to problems in the production of the non-woven materials which is caused in particular by a relative movement between the fibers of the non-woven material and the surface of the conveyor belt, thus causing slippage. A certain adhesion of the non-woven layer at the transport band, however, is important since a uniform haul-off or extraction is necessary for constant production and high product quality. This is important in particular for increasing machine speed. On the other hand side, the adhesion of the fibers must not be excessive since a haul-off, this means transfer to the next conveyor belt may not occur at the transfer position.

A conveyor belt is known from U.S. Pat. No. 6,790,796 B2 which can be used for producing non-woven fabrics from threads that have a rough surface so that a slippage of the non-woven material to be formed is prevented. Thus, the intentionally rough threads can be configured e.g., in a form of structured, e.g., grooved monofilaments or also in the form of twisted yarns. It can also be provided that the roughness and thus the anti-slip effect is directional, this means it only occurs in the running direction of the conveyor belt. Furthermore, also an optional jacket-core configuration is proposed for the rough threads.

Even with the risk of slipping relative to smoother surfaces or conveyor belt surfaces reduced through the known improved roughness of the thread or fabric surface according to U.S. Pat. No. 6,790,796 B2, the properties of the known conveyor belts in the production process are not satisfactory yet.

DE 103 46 246 A1 discloses a paper machine felt including combination threads and a method for producing a paper machine felt of this type. A base fabric is described in particular from which a covering for paper machines or a textile material for other industrial methods shall be produced using additional production steps. The base fabric includes at least one combination yarn made from filaments which are produced from polyamide and thermoplastic polyurethane. Thus, the known base fabric with one or plural fiber non-woven material shall be needled on its entire surface in order to obtain a press felt for an application in a press section of a paper machine. The base fabric as such that includes the thermoplastic polyurethane threads is not configured for direct application but also requires applying additional layers. When using the base fabric for producing a press felt, water receiving capacity in the center base thread shall be increased by the thermoplastic polyurethane and elasticity and compressibility of the press felt shall be improved in the thickness direction.

Furthermore, DE 10 2007 047 880 A1 discloses a paper machine covering which shall either be used as a press felt or as a dry sieve. The core idea of this known paper machine covering is to provide a variable filament diameter in a longitudinal direction of the threads that are connected to form a fabric. The employed threads furthermore include a core-jacket configuration, wherein the thread core is made for example from polyamide and shall receive the longitudinal forces, whereas the thread core is made from a thermoplastic elastomeric material, in particular a thermoplastic polyurethane. Even when the thread jacket can come in contact with the paper web to be transported, the thermoplastic elastomeric materials has been selected in order to achieve improved damping of vibrations in the covering during operations of the paper machine.

Last not least DE 20 53 624 A1 describes a fabric for belts or conveyor belts wherein a load receiving inner reinforcement fabric is coated with a rubber matrix material forming the band surface. In order to improve the connection, in particular the cohesion between the reinforcement fabric and the coated material, the threads of the reinforcement fabric are provided with a jacket made from natural or synthetic rubber or polyurethane or a mix thereof before being coated with the matrix material. The recited jacket materials do not come in contact with the material that is transported on the conveyor belt after the coating material is applied, this means in a finished condition of the belt or the conveyor band since the jacket materials are only in an interior of the conveyor belt.

BRIEF SUMMARY OF THE INVENTION

Thus, it is an object of the invention to propose an industrial fabric, in particular a conveyor belt for transporting a non-woven material web during production or handling wherein a risk of slippage between the transported web and the conveyor belt is further reduced.

Improving upon the method of the type recited supra, the object is achieved by a method for producing a non-woven material, the method comprising: using a spun non-woven or melt spun method; using an arrangement including a conveyor belt; forming a web of the non-woven material on a surface of the conveyor belt while being moved, wherein the conveyor belt includes a product side that is in contact with the non-woven material, and a machine side that is in contact with conveying devices of the arrangement to produce the non-woven material, wherein the conveyor belt includes longitudinal threads that extend in a running direction of the web of the non-woven material and transversal threads perpendicular to the longitudinal threads, wherein the longitudinal threads and the transversal threads are woven together, wherein at least a portion of the longitudinal threads of a surface that is oriented towards the product side of the conveyor belt is made from a polymeric material which includes at least a portion of a thermoplastic elastomeric material, wherein the longitudinal threads that are arranged on the machine side are made from extrudable synthetic material and are not in contact with the non-woven material, and wherein the longitudinal threads that are arranged on the machine side have different properties from the longitudinal threads that are arranged on the product side.

Contrary to U.S. Pat. No. 6,790,796 B2, effectiveness of the transport band according to the invention with respect to the anti-slippage effect is not only based on properties of the surface structure, this means in particular geometric properties, but at least also based on the particular material properties, this means properties which improve adhesion between the fibers of the non-woven material web and the surface of the transport belt in addition to the roughness. This way an increased friction coefficient is achieved which prevents a slippage, this means a relative movement between the transport band and the woven material web. Tests have shown that a stability of the production process for producing a non-woven material web with transport bands could be improved over the prior art by the fabric according to the invention.

As a matter of principle, a multitude of binding types is feasible for the industrial fabric according to the invention. In order to satisfy different requirements upon the fabric with respect to the product side on the one hand side, and the machine side on the other hand side, it can be advantageous when at least two layers of longitudinal threads are provided which are arranged in pairs stacked on top of each other or above or below each other and which form the longitudinal threads on the product side and the longitudinal threads on the non-product side. In this case, the product side longitudinal threads can be optimized especially with respect to the adhesion properties in order to minimize the slippage effect whereas the non-product side longitudinal threads can be tailored to the mechanical properties of the fabric in order to achieve, for example, a particularly high tensile strength of the transport band and a high abrasion resistance and thus a high service life. The paired stacked arrangement of the two layers of the longitudinal threads facilitates implementing a rather small fabric thickness in spite of the longitudinal threads typically being configured as warp threads.

In one embodiment of the fabric according to the invention, the longitudinal threads have a single layer of transversal threads, wherein advantageously alternatively a respective transversal thread with a larger diameter and a transversal thread with a smaller diameter are arranged behind one another in a direction of the longitudinal threads. Further advantageously the transversal threads with the smaller diameter bind with the longitudinal threads, whereas the transversal threads with the larger diameter pass through between the product side longitudinal threads and the non-product side longitudinal threads and form a type of filling thread. This binding type yields a fabric with a particularly smooth surface which has excellent adhesion properties at least on the product side due to the material properties according to the invention.

On the one hand side, it is possible to use longitudinal and/or transversal threads in the fabric according to the invention on the product side wherein the longitudinal and/or transversal threads have a cross section that is respectively made from one material. Alternatively, however it is also possible that a respective cross-section of the product side longitudinal threads and the product side transversal threads includes at least two portions wherein a first portion is made from the thermoplastic elastomeric material with particular adhesion properties and a second portion is made from another material wherein a substantial, advantageously major percentage, of a tension force impacting the respective product side longitudinal threads is transferrable by the second portion.

For a subdivision of the entire cross-section that is described supra, it can be advantageous that the cross-section of the product side longitudinal threads includes a first portion in a form of a jacket and a second portion in a form of a core, wherein the jacket envelopes the core. In this case, strength properties (from the core) and wear properties and adhesion properties (from the jacket) of the thread can be advantageously combined with each other quite well, wherein an orientation of the thread within the fabric is irrelevant due to the jacketing with the material with the good adhesion properties which simplifies the production of the fabric according to the invention and which facilitates in particular also using threads with a circular outer contour.

According to an embodiment of the invention it is provided that the product side longitudinal threads and/or the product side transversal threads are co-extruded and/or extruded in two sequential steps wherein the core is extruded in the latter case in a first step and the advantageously annular jacket about the core is extruded or coated in a second step. Alternatively, it is also possible that two transversal portions of the respective threads are extruded adjacent to each other by so-called "side-by-side" extrusion. This is possible for threads with circular cross-sections, wherein the partial cross-sections then advantageously form semicircles but also for flat threads which are then advantageously assembled from two partial cross-sections that are also flat in a "stacked" arrangement.

For longitudinal threads and/or transversal threads with a flattened, advantageously rectangular cross-section, a ratio of a height of the cross-section to a width of the cross-section can be advantageously between 1:1.2 and 1:10, further advantageously between 1:1.5 and 1:4.

In a particular embodiment of the fabric according to the invention, at least a portion of the longitudinal threads has a circular cross section, and at least a portion of the surface of the longitudinal threads is made from a thermoplastic elastomeric material, wherein plural identical longitudinal threads with a respective circular cross-section run parallel adjacent to each other and run on the same path through the fabric. This way a risk of slipping between the transport band and the non-woven material web can be further reduced since a certain surface roughness of the fabric according to the invention is added to the material properties that improve the adhesion properties wherein the surface roughness is increased by breaking a flat wide longitudinal thread down into a plurality of narrower (circular) longitudinal threads. When producing non-woven materials different requirements are placed upon the adhesion properties of the "adhesion threads" configured according to the instant invention depending on the actual production method and the respective material properties of the spun fiber, and the material properties of other threads of the transport fabric band. Thus, it is possible through individual threads which are advantageously integrated into the binding type of the fabric, in a particular repeat threads to adjust the adhesion within particular limits as desired. Thus, for example, a predetermined number of warp threads and/or weft threads can include a thermoplastic elastomeric material, whereas the remaining warp and weft threads are made from a different material, in particular from polyester. Thus, is it conceivable that, e.g., every second, third, fourth or fifth warp and/or weft thread includes a thermoplastic elastomeric material. Advantageously a repeat pattern (rapport) is provided in the fabric structure. Thus, the threads which include the thermoplastic elastomeric material can have the same thread pattern, but they can also run through the fabric in different paths like, e.g., in a fabric with different types of weft threads, wherein a particular number of threads includes the thermoplastic elastomeric material for each type. As already recited supra, a maximization of the adhesion properties is not desirable since there is a risk of unsatisfactory disengagement of the non-woven material and a deficient transfer of the woven material web to the next transport band.

Advantageously the longitudinal threads and/or the transversal threads are monofilaments. Further advantageously they are made entirely from a synthetic material. It is also conceivable that the longitudinal threads and/or the transversal threads have a metal wire core wherein a jacket made from a synthetic material, in particular from a thermoplastic elastomeric material, extends about the metal wire core.

In order to prevent charging with static electricity during production of a non-woven material and in order to be able to discharge electric charges from the conveyor belt, a portion of the longitudinal threads and/or transversal threads can be electrically conductive, in particular can include carbon at an outer jacket of the cross section of the threads, in particular can be provided with a carbon coating, and/or the polymeric material of the respective threads can include carbon nanotubes, advantageously in a homogenous distribution, advantageously at a percentage of at least 15% by weight, further advantageously at a percentage of at least 20% by weight.

Particularly good adhesion properties can be obtained when the thermoplastic elastomeric material is
a block co-polymer with alternating soft and hard segments, or
a mix/alloy of a thermoplastic polymer, or
a composition including a rubbery polymer and a thermoplastic polymer with a highly vulcanized/cross-linked rubbery polymer in a finely dispersed thermoplastic polymer.

In particular the thermoplastic elastomeric material can be
a styrene block co-polymer, in particular a styrene butadiene styrene, or
a thermoplastic polyolefin, in particular a mix/alloy of polypropylene and cross-linked EPDM rubber, or
a thermoplastic vulcanized material, in particular a mix of polypropylene and ethyl propylene dien EPDM rubber wherein the two latter components are dynamically vulcanized/cross-linked during the compounding process, or
a thermoplastic polyurethane, in particular based on a polyester urethane or a polyether urethane, or
a thermoplastic co-polyester or
a EPDM rubber material that is processable through melting, or
a thermoplastic polyether block amide advantageously with amide links between hard and soft segments, or
an ionomeric thermoplastic elastomeric material.

An endless woven fabric according to the invention has to be joined into an endless band or belt before being used as a conveyor belt if it has not already been woven into a hose. Typically joining the fabric section to be formed into a conveyor belt is performed by a seam. The seam can be, for example, a spiral seam that includes seam spirals that extend over an entire width of the transport band and which are respectively rotated or hooked into loops of longitudinal threads of the opposite fabric ends and which are both coupled with one another by a closing wire that extends over an entire width of the transport band. As an alternative to a configuration as a spiral seam, the seam can also be configured as a chain loop seam, in turn with one or plural closing wires or as a welded seam. Thus, e.g., a welded seam is produced, e.g., by laser welding or ultrasonic welding. The transport band can either be closed by this seam in an irreversible manner or also in a reversible manner in that, e.g., seam elements that have to be opened and closed by a closing wire in a reversible manner are connected with the respective opposite fabric ends in an irreversible manner by the welding (c.f. WO 2011/069259 A1 and WO 2011/069258 A1 and WO 2010/121 360 A1).

In case of a spiral seam the seam spirals can also be made from a respective thread whose cross section includes at least two portions, namely, e.g., a core on the one hand side and on the other hand side a jacket enclosing the core or in other cross sectional distributions, wherein a portion oriented towards the product side, in particular the jacket is advantageously made from a thermoplastic elastomeric material. In this case adhesion properties for the transport band are identical over its entire circumferential surface so that a risk of sliding through is not increased in the seam portion either.

BRIEF DESCRIPTION OF THE DRAWINGS

The invention is subsequently described with reference to three embodiments of fabrics according to the invention respectively configured as a conveyor belt to produce a non-woven material, wherein.

DETAILED DESCRIPTION OF THE INVENTION

Figure 1:
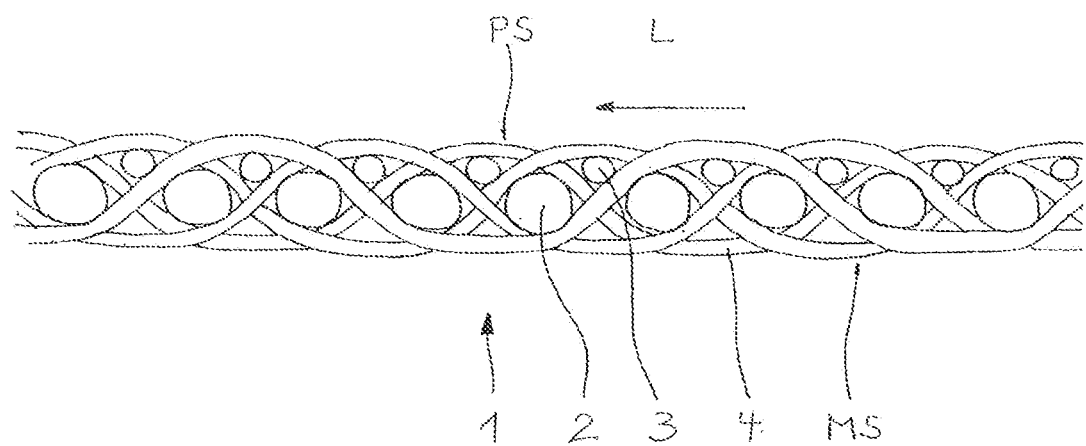
FIG. 1 illustrates a longitudinal sectional view through a first embodiment of a fabric according to the invention.

FIG. 1 illustrates a fabric 1 configured as a transport band, in particular for a device for producing a non-woven spun material. As evident from the longitudinal sectional view the fabric 1 is configured in one layer and includes transversal threads 2 such as mono filaments with a circular cross section and a larger diameter which form a lower transversal thread layer oriented towards a machine side MS and transversal threads 3 which form an upper layer that is oriented towards the product side PS. The transversal threads 2 respectively form weft threads of the fabric 1.

Additionally the fabric 1 includes longitudinal threads 4 which extend with floats respectively on the product side PS as well as on the machine side MS of the fabric 1. Both floats have identical length and extend respectively over three transversal threads 2, 3. The longitudinal threads 4 that form the warp threads of the fabric also have a circular cross-section wherein the diameter of the longitudinal threads 4 corresponds to the diameter of the transversal threads 3 with the smaller diameter.

According to the invention either all longitudinal threads 4 or transversal threads 2, 3 can include a thermoplastic elastomeric material or only individual transversal threads like, e.g., every third, fourth or xth longitudinal thread. It is also conceivable that threads that only include one thermoplastic elastomeric material are arranged in one or both edge portions or only in the center portion of the transport band. In the fabric illustrated in FIG. 1 the longitudinal threads 4 are mostly made from PET, wherein a predetermined number of longitudinal threads 4 is provided with electrically conductive properties. Each fourth longitudinal thread 4 is made from a thermoplastic elastomeric material provided in a form of jacket-core threads. Alternatively the longitudinal threads 4 can also include a portion of up to 50% by weight made from coextruded threads, wherein the remaining portion of the material is made from monofill extrudable synthetic materials like PET, PA, PPS, PEEK, PLA, and/or anti-static monofilaments or monofilaments that include PU. The friction coefficient of the material of the longitudinal threads 4 relative to paper according to DIN 53375 is between 0.30 μ and 0.99 μ, advantageously between 0.30 μ and 0.8 μ, further advantageously between 0.40 μ and 0.70 μ. Even though the transport band according to the invention is used for transporting non-woven materials the paper referenced friction coefficient is indicative and the interval is advantageous. The transversal threads 3 which also partially extend at a product side of the fabric 1 are also made from jacket-core threads or at least at a percentage of 50% from coextruded threads wherein the outer jacket is respectively made from a thermoplastic elastomeric material. The transversal threads 2 with the larger diameter are typically made from conventional monofill extrudable synthetic materials like PET, PA, PPS, PEEK, PLA and/or from antistatic monofilaments and monofilaments that include PU. However, it can also be provided that the transversal threads are completely or partially made from thermoplastic elastomeric materials.

Figure 2:
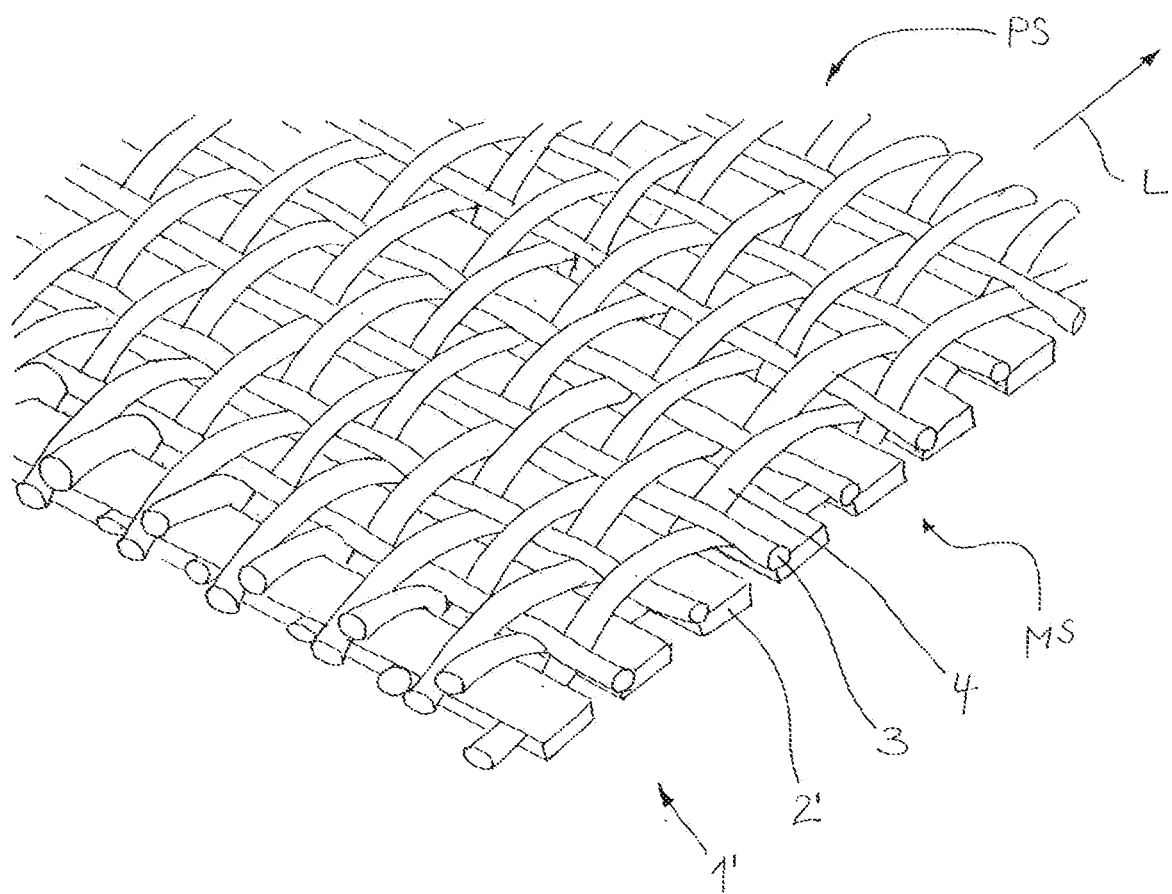
FIG. 2 illustrates a perspective view of a second embodiment of a fabric according to the invention.

The longitudinal threads 4 of the fabric 1' according to FIG. 2 are also completely or partially made from thermoplastic elastomeric material. The transversal threads 3 in turn have the same diameter as the longitudinal threads 4 and are made from the same material. Differently from the fabric 1 according to FIG. 1, the transversal threads 2' of the fabric 1' are configured according to FIG. 2 with a flat, namely rectangular, cross-section. The flatter sides of the transversal threads 2' extend parallel to the tangential planes at the two surfaces 1'. The surface of the fabric 1' that is visible in FIG. 2 forms the product side PS of the fabric 1', the other non-visible surface forms the machine side MS. The flattened transversal threads 2' which do not extend to the surface that forms the product side PS are made from conventional monofill extrudable plastic materials like PET, PA, PPS, PEEK, PLA, and/or from antistatic monofilaments and monofilaments that include PU. However, it can also be provided that the transversal threads are entirely or partially made from thermoplastic elastomeric material.

Figure 3:
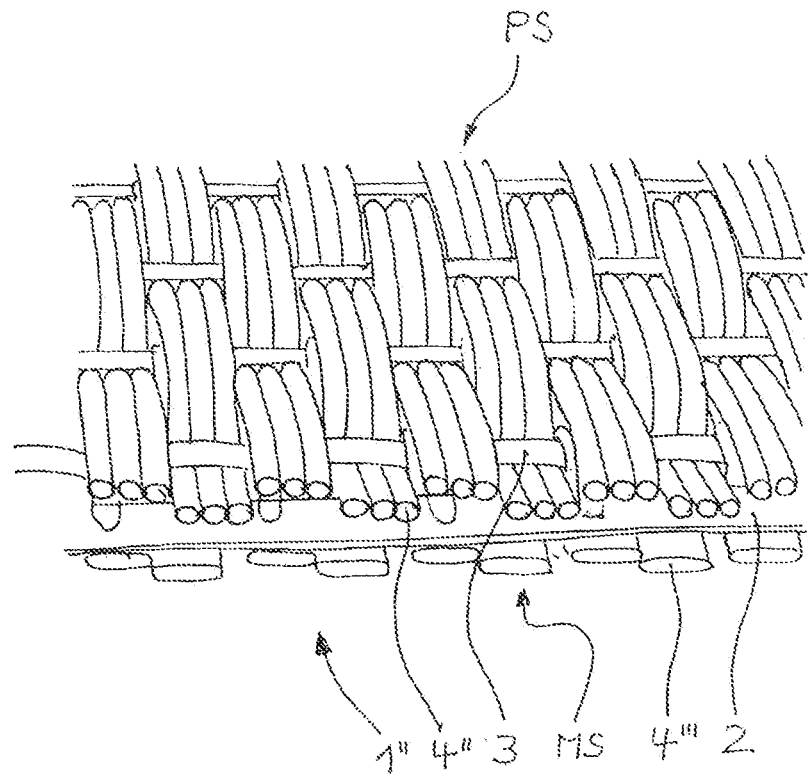
FIG. 3 illustrates a third embodiment of a fabric according to the invention in a perspective view.
Figure 4:
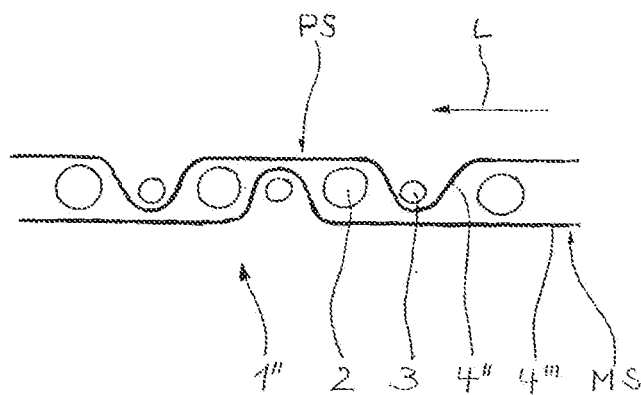
FIG. 4 illustrates a longitudinal, sectional view through the fabric according to FIG. 3.

Contrary to the fabrics 1 and 1' illustrated in FIGS. 1 and 2, the fabric 1" that is visible in FIG. 3 only includes one single weft layer but two warp layers which are arranged in the fabric 1" in an arrangement where the layers are vertically stacked on top of each other in the fabric 1". A longitudinal cut through the fabric is illustrated in FIG. 4.

An upper warp layer is formed by the longitudinal threads 4" which are respectively arranged in triplet groups adjacent to each other wherein all longitudinal threads 4" of a respective triplet group have an identical path through the fabric 1" (besides the lateral offset respectively by the diameter of a longitudinal thread 4"). The longitudinal threads 4" form a surface of the fabric 1" that is oriented towards the product side PS. The longitudinal threads 4" can be made from different materials depending how much adhesion has to be generated. Too much adhesion is disadvantageous since the non-woven material is not released anymore. In the embodiment illustrated in FIGS. 3 and 4 the respective center longitudinal thread 4" of the three longitudinal threads that form a triplet group is made from a thermoplastic elastomeric material, namely as a jacket-core thread or as a coextruded thread. Also other portions between the longitudinal threads 4" made from the thermoplastic elastomeric material and the remaining longitudinal threads 4", e.g., from PET, are conceivable.

The longitudinal threads 4''' that are oriented towards the machine side MS are formed by band shaped monofilaments whose width measured transversal to the running direction L of the fabric 1" corresponds to three times the diameter of the longitudinal threads 4" oriented towards the product side PS. Three longitudinal threads 4" forming a group and a longitudinal thread 4''' arranged respectively thereunder are in a stacked arrangement within the fabric 1".

The fabric 1" only includes a single weft layer, which is formed alternatively by transversal threads 2 with a larger diameter and transversal threads 3 with a smaller diameter. The transversal threads 3 function as so called "binding wefts" that bind the longitudinal threads 4" and 4''', whereas the transversal threads 2 with the larger diameter function as filling wefts which support the longitudinal threads 4", 4''' at a predetermined distance in a portion of the float and which provide a smooth surface on the product side PS as well as on the machine side MS.

The longitudinal threads 4" with round cross-section that are arranged on the product side PS are entirely or partially made from a thermoplastic elastomeric material that is provided in the form of jacket-core threads or coextruded threads. On the other hand side, the longitudinal threads 4''' that are arranged on the machine side MS are made from conventional monofill extrudable synthetic material like PET, PA, PPS, PEEK, PLA, and/or from antistatic and PU-including monofilaments. However, it can also be provided that the longitudinal threads are completely or partially made from thermoplastic elastomeric materials. The transversal threads 2 with the larger diameter are typically made from conventional monofill extrudable synthetic materials like PET, PA, PPS, PEEK, PLA, and/or antistatic and PU-including monofilaments. However, it can also be provided that these are entirely or partially made from thermoplastic elastomeric materials. The transversal threads 3 which also partially extend at the product side PS of the fabric 1 can also be entirely or partially configured as threads from a thermoplastic elastomeric material.

REFERENCE NUMERALS AND DESIGNATIONS 1, 1', 1" Fabric
2 Transversal thread
3 Transversal thread
4, 4', 4", 4''' Longitudinal thread
L Running direction
MS Machine side
PS Product side

What is claimed is:

1. A method for producing a non-woven material, the method comprising:
   using a spun non-woven or melt spun method;
   using an arrangement including a conveyor belt; and
   forming a web of the non-woven material on a surface of the conveyor belt while the surface of the conveyor belt moves,
   wherein the conveyor belt includes a product side in contact with the non-woven material, and a machine side in contact with conveying devices of the arrangement to produce the non-woven material,
   wherein the conveyor belt includes longitudinal threads that extend in a running direction of the web of the non-woven material and transversal threads perpendicular to the longitudinal threads,
   wherein the longitudinal threads and the transversal threads are woven together,
   wherein at least a portion of the longitudinal threads of a surface that is oriented towards the product side of the conveyor belt is made from a polymeric material which includes at least a portion of a thermoplastic elastomeric material,
   wherein the at least a portion of the longitudinal threads of the surface that is oriented towards the product side of the conveyor belt have a predetermined total number of warp threads and a predetermined total number of weft threads,
   wherein the at least a portion of the longitudinal threads of the surface that is oriented towards the product side of the conveyor belt have a predetermined number of warp threads and/or a predetermined number of weft threads that include the thermoplastic elastomeric material,
   wherein the at least a portion of the longitudinal threads of the surface that is oriented towards the product side of the conveyor belt have a portion of the predetermined total number of warp threads and/or a portion of the predetermined total of weft threads that include the thermoplastic elastomeric material with a remaining portion of the predetermined total number of warp threads and a remaining portion of the predetermined total of weft threads that include a different material, and
   wherein the longitudinal threads that are arranged on the machine side are made from extrudable synthetic material,
   wherein a respective cross-section of product side longitudinal threads or of the transversal threads includes at least two portions,
   wherein a first portion of the at least two portions is made from the thermoplastic elastomeric material and a second portion of the at least two portions is made from another material, and
   wherein the second portion is capable of transmitting a larger portion of a tension force that impacts the product side of the longitudinal thread than the first portion.

2. The method according to claim 1,
   wherein the conveyor belt includes a single layer of transversal threads,
   wherein a respective transversal thread with a larger diameter and a transversal thread with a smaller diameter are arranged in an alternating manner behind one another in a direction of the longitudinal threads, and
   wherein the transversal threads with the smaller diameter bind the longitudinal threads and the transversal threads with the larger diameter run through between product side longitudinal threads and non-product side longitudinal threads.

3. The method according to claim 1, wherein at least two layers of the longitudinal threads are provided which are stacked in pairs above or below one another and form product side longitudinal threads and non-product side longitudinal threads.

4. The method according to claim 1,
   wherein a cross-section of product side longitudinal threads or of the transversal threads includes a first portion configured as a jacket and a second portion configured as a core, and
   wherein the jacket encloses the core.

5. The method according to claim 1,
   wherein product side longitudinal threads are coextruded or extruded in two sequential steps, and
   wherein the core is extruded in a first step and the jacket that has an annular cross-section is extruded or coated around the core in a second step, or
   two portions of the cross-section are extruded adjacent to each other wherein the portions are either respectively semicircular and overall form a circular cross-section or respectively form a flat cross-section and complement each other to form an overall flat thread cross section.

6. The method according to claim 1,
   wherein the longitudinal threads or the transversal threads have a flattened or rectangular cross-section, and
   wherein a ratio of height of the cross section to width of the cross-section is between 1:1.2 and 1:10.

7. The method according to claim 1,
   wherein at least a portion of the longitudinal threads has a circular cross-section and at least a portion of the surface of the longitudinal threads is made from a thermoplastic elastomeric material, and wherein plural identical longitudinal threads with a respective circular cross-section extend parallel adjacent to each other and run on an identical path through the fabric.

8. The method according to claim 1, wherein the longitudinal threads or the transversal threads are monofilaments.

9. The method according to claim 1,
wherein a portion of the longitudinal threads or of the transversal threads is electrically conductive, or
wherein an outer jacket of a cross-section of the respective threads includes carbon or the outer jacket of the respective threads is provided with a carbon coating, or
wherein the polymeric material of the respective threads includes carbon nanotubes in a homogeneous distribution in a percentage of at least 15% by weight.

10. The method according to claim 1,
wherein the thermoplastic elastomeric material is block copolymer with alternating soft segments and hard segments, or
a mix or an alloy of a rubbery polymer with a thermoplastic polymer, or
a composition of a rubbery polymer and a thermoplastic polymer with a highly vulcanized or cross-linked rubbery polymer in a finely distributed thermoplastic polymer.

11. The method according to claim 10, wherein the thermoplastic elastomeric material
is a styrene block copolymer, or
a styrene butadiene styrene, or
a thermoplastic polyolefin, or a mix or alloy made from polypropylene and a cross-linked EPDM rubber, or
a thermoplastic vulcanized material or a mix made from polypropylene and ethylene propylene diene (EPDM) rubber, wherein the two latter components are dynamically vulcanized/cross-linked during a compounding process, or
a thermoplastic polyurethane, based on a polyester-urethane or a polyether-urethane, or
a thermoplastic copolyester; or
an EPDM rubber that is processable by melting, or
a thermoplastic polyether block amide, advantageously with amide compounds between hard and soft segments, or
an ionomeric thermoplastic elastomeric material.

12. The method according to claim 1,
wherein the conveyor belt is closed to form an endless conveyor belt by a seam that connects two fabric ends,
wherein the seam is a spiral seam which includes two seam spirals that extend over an entire width of the transport band,
wherein the two seam spirals are respectively turned or engaged in loops of longitudinal threads of opposite fabric ends and both are coupled with each other by a closing wire that extends over an entire width of the conveyor belt.

13. The method according to claim 12,
wherein the seam spirals are respectively made from a thread whose cross-section includes at least two portions,
wherein one portion is configured as a core and another portion is configured as a jacket that envelopes the core, and
wherein the jacket is made from a thermoplastic elastomeric material.

14. The method according to claim 1, wherein the polymeric material of the longitudinal threads including the thermoplastic elastomeric material or of the transversal thread has a static friction coefficient p relative to paper measured according to DIN 53375 between 0.3 and 0.99.

15. The method according to claim 1,
wherein at the most every eighth product side longitudinal thread or product side transversal thread is made from a polymeric material at least in portions of the surface oriented towards the product side, and
wherein the polymeric material includes at least a portion of a thermoplastic elastomeric material.

16. The method according to claim 1,
wherein the longitudinal threads include longitudinal threads that are oriented towards the product side and longitudinal threads that are oriented towards the machine side,
wherein an entire external surface of the longitudinal threads that are oriented towards the product side is made from the thermoplastic elastomeric material and an entire external surface of the longitudinal threads that are oriented towards the machine side does not include any of the thermoplastic elastomeric material.

17. A non-woven material produced by the method according to claim 1.

* * * * *